(12) United States Patent
Rozendaal (10) Patent No.: US 6,695,069 B2
(45) Date of Patent: Feb. 24, 2004

(54) SPRING ROCKFLEX BEARING ARM (75) Inventor: Jacobus A. Rozendaal, Salford (CA)

(73) Assignee: Salford Farm Machinery Ltd., Salford (CA)

( * ) Notice: Subject to any disclaimer, the term of this patent is extended or adjusted under 35 U.S.C. 154(b) by 0 days.

(21) Appl. No.: 10/090,831

(22) Filed: Mar. 6, 2002

(65) Prior Publication Data

US 2002/0125019 A1 Sep. 12, 2002

Related U.S. Application Data (60) Provisional application No. 60/273,351, filed on Mar. 6, 2001.

(51) Int. Cl.$^7$ ................................................. A01B 35/28
(52) U.S. Cl. ........................................ 172/601; 172/572
(58) Field of Search ................................. 172/570, 572, 172/599, 601, 705, 707, 708, 178

(56) References Cited

U.S. PATENT DOCUMENTS

| | | | | |
|---|---|---|---|---|
| 1,331,722 A | * | 2/1920 | Remy | 172/537 |
| 2,762,182 A | * | 9/1956 | Gardner | 172/572 |
| 3,098,529 A | * | 7/1963 | Wade et al. | 172/265 |
| 3,493,055 A | * | 2/1970 | Van Peursem | 172/708 |
| 3,620,310 A | | 11/1971 | Richey | |
| 4,004,640 A | * | 1/1977 | Bland | 172/710 |
| 4,098,348 A | * | 7/1978 | McChesney | 172/406 |
| 4,185,699 A | * | 1/1980 | Lewison | 172/724 |
| 4,333,535 A | | 6/1982 | Hentrich, Sr. | |
| 4,396,070 A | | 8/1983 | Brandner et al. | |
| 4,492,272 A | * | 1/1985 | Jensen | 172/178 |
| 4,796,550 A | * | 1/1989 | Van Natta et al. | 111/135 |
| 4,828,042 A | | 5/1989 | Arnold | |
| 5,158,145 A | * | 10/1992 | Karchewski | 172/548 |
| 5,267,619 A | | 12/1993 | Eversole | |
| 5,450,908 A | | 9/1995 | Hagman et al. | |
| 5,632,343 A | * | 5/1997 | Gengler | 172/552 |
| 5,785,129 A | * | 7/1998 | Keller et al. | 172/536 |

* cited by examiner

Primary Examiner—Victor Batson
(74) Attorney, Agent, or Firm—Anissimoff & Assoc.; Hans Koenig (57) ABSTRACT A disc harrow has a frame and a plurality of earth working discs. Each disc has a central aperture for attachment to a gang shaft. A mount attaches the gang shaft to the underside of the frame and has bearings to permit rotation of the shaft in response to forward movement of the disc harrow. The mount includes a first structural member, a second structural member and a resilient spring connected between the two members. In operation, upon striking of an obstacle by the discs, the gang shaft is permitted to upwardly deflect by the mount to prevent damage to the disc harrow. The second structural member has first and second portions with aligned longitudinal axes. The first and second portions are rotationally connected to permit rotation of the second portion in response to an angular moment applied to the second portion by deflection of the gang shaft. The rotational connection permits the bearing to automatically maintain a preferred alignment with the gang shaft during deflection, thereby preventing damage to the bearing.

14 Claims, 7 Drawing Sheets

SPRING ROCKFLEX BEARING ARM

This patent application claims priority from U.S. Provisional Patent Application No. 60/273,351 filed on Mar. 6, 2001.

BACKGROUND OF THE INVENTION

1. Field of the Invention

The invention relates to a disc harrow farm implement. The disc harrow has a frame with an attached disc gang comprising a plurality of ground engaging discs attached to a gang shaft. In particular, the present invention relates to a novel linkage arrangement for attaching the disc gang to the frame.

2. Description of the Prior Art

The disc harrow is a farm implement that is used to turn and mix soil. The disc harrow includes a frame that is towed behind a tractor with a plurality of earth working disc shaped blades, or discs that engage the ground. Each disc is normally concave and the center of each disc has an aperture for mounting the disc on a gang shaft. A plurality of substantially parallel discs mounted to the shaft at uniformly spaced apart intervals along its length is referred to as a disc gang. Each disc gang is attached to the frame by means of mounts downwardly depending from the frame at suitable intervals along the length of the shaft. Each mount includes a bearing at its lowermost end for receiving the gang shaft to permit rotation thereof. In operation, the frame is lowered, typically by means of hydraulic cylinders powered by a hydraulic pump on the tractor, in order that the discs engage the soil, thereby causing the shaft to rotate in response to forward movement of the tractor. The circumference of each disc is sharpened to allow the disc to cut through any residual plant material from the previous crop remaining on the surface of the soil. Each gang is generally attached at an angle to the direction of travel of the tractor and, due to the concavity of the discs, turns and mixes the soil as it is pulled through the field. Disc harrows may accordingly be used as primary tillage implements or as seedbed-finishing machines.

Due to the weight of the frame, the discs may penetrate the ground by a depth of several inches. Impact of the discs with a sub-terranean obstacle, such as a rock, causes the entire implement to be lifted out of the soil in order to pass over the obstacle and can cause damage to the implement. Types of damage include broken or bent discs, bent or broken gang shafts and bearing failures due to twisting or asymmetric loading of the gang shaft.

In an attempt to reduce this type of damage, a flexible rearward facing C-shaped mount, typically made of spring steel, may be used to permit the gang to upwardly deflect in response to impact with an obstacle. Since the mount must be sufficiently stiff to resist deflection of the gang during normal operation, the C-shaped mount is quite stiff and does not easily deflect. Due to its stiffness, the C-shaped mount is prone to breakage when a particularly large obstacle is encountered. Also, the amount of force required to cause deflection is not readily adjustable and the mount provides very little range of vertical motion for the disc gang. Accordingly, the C-shaped mount has proven relatively ineffective at preventing damage to the implement.

Another type of flexible mount includes a pair of structural support members connected by a coil spring, as shown in U.S. Pat. No. 4,333,535. The first structural support member has an upper end rigidly attached to the frame and downwardly extends therefrom to its lower end. The lower end is pivotally attached to an upper end of the second structural support member, which has a bearing integrally formed within its lower end for receiving the gang shaft. The coil spring connects the first and second members and is normally compressed therebetween by means of a yoke that maintains an acute angle between the first and second members. The second member is allowed to vertically pivot in response to impact of the disc gang with obstacles, and the pivoting movement is resisted by compression of the spring. The amount of compression of the spring in the normal position may be changed by adjusting the yoke to thereby pre-set the amount of impact force required to cause vertical movement of the gang. This mount mechanism permits a greater amount of vertical travel than the C-shaped mount and may be readily adjusted to permit the gang to deflect upon impact.

The coil spring mount functions well to permit vertical deflection of one end of the gang shaft, causing the shaft to adopt an angled orientation with respect to the ground when riding over an obstacle. Since the bearing is fixed with respect to the second structural support member and pivots in the same vertical plane, the angled orientation of the shaft places an asymmetric load on the bearing, leading to premature bearing wear and excessive bearing maintenance. A need therefore exists to solve the problem of excessive bearing maintenance in coil spring mounted disc gangs.

SUMMARY OF THE INVENTION

This invention seeks to overcome the aforementioned problem of excessive bearing maintenance in coil spring mounted disc gangs.

According to the present invention, there is provided a disc harrow comprising a frame, a disc gang, and a support assembly for supporting the disc from the frame. The disc gang has a gang shaft adapted for vertical movement with reference to the frame having a plurality of ground engaging discs centrally mounted on the shaft. The support assembly comprises a first structural member, a second structural member, and a resilient means. The first structural member has an upper end and a lower end, the upper end attached to the frame and the lower end remote from the frame. The second structural member has a first end portion and a second end portion. The first end portion is pivotally attached to the lower end of the first structural member. The second end portion has bearing means for rotatably supporting the gang shaft. The resilient means has an upper and lower end, the upper end pivotally attached to the upper end of the first structural member and the lower end pivotally attached to the second structural member. The second structural member is operable to vertically pivot and the resilient means is operable to resist the pivotal movement. The second end portion is rotatably connected to the first end portion by rotational means to permit the second end portion to rotate with reference to the first end portion about the longitudinal axis of the second structural member in response to the pivotal movement of the second structural member and corresponding vertical movement of the gang shaft.

Further features of the invention will be described or will become apparent in the course of the following detailed description.

BRIEF DESCRIPTION OF THE DRAWINGS

In order that the invention may be more clearly understood, a preferred embodiment thereof will now be described in detail by way of example, with reference to the accompanying drawings, in which.

PREFERRED EMBODIMENT

Figure 1:
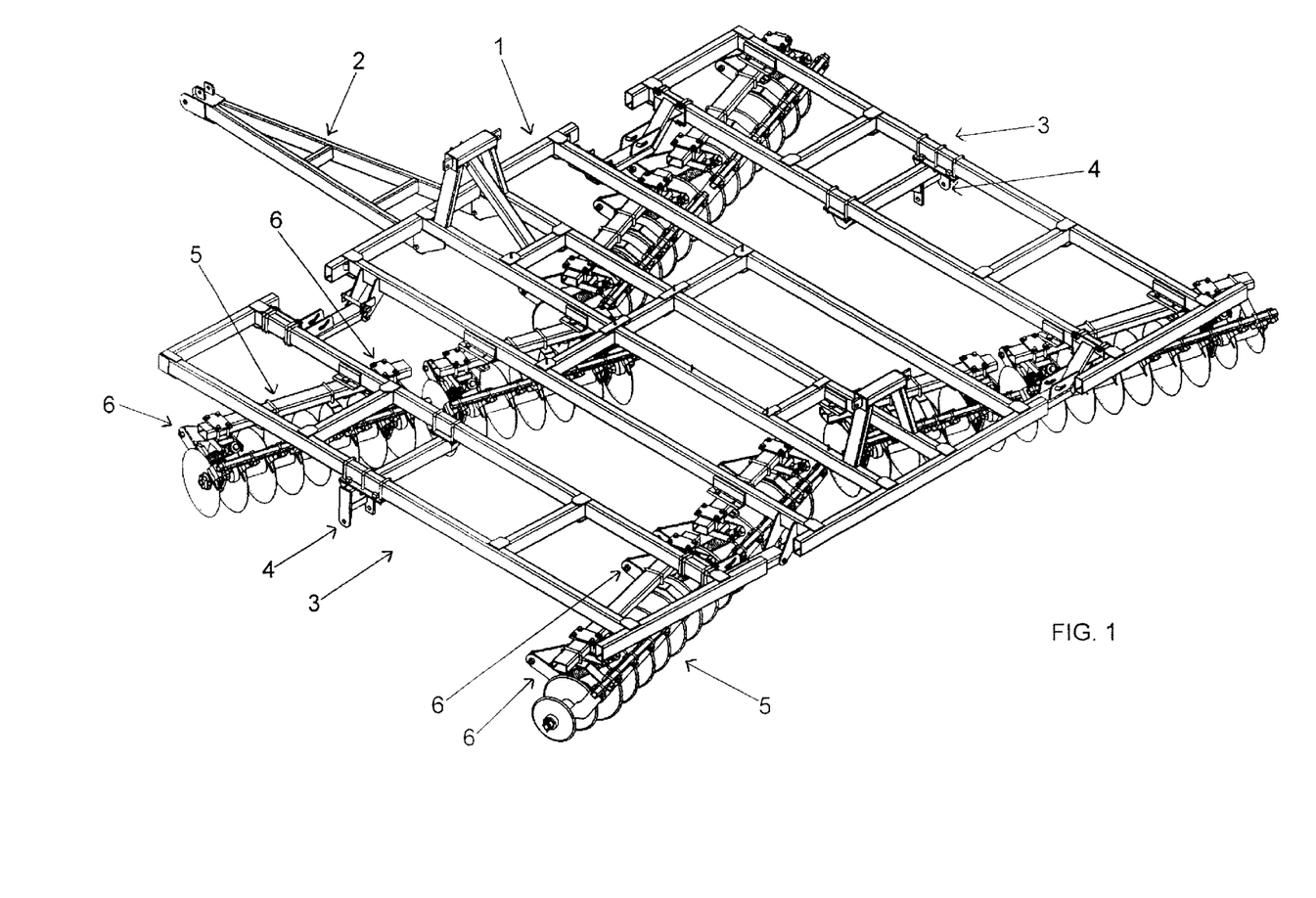
FIG. 1 is a perspective illustration of a disc harrow.

With reference to FIG. 1, a disc harrow is shown having a frame 1 and a tongue 2, adapted for conventional attachment to the drawbar of a tractor using a draw pin. The frame has folding wings 3 to permit the overall width of the implement to be decreased for road travel. The frame is provided with mounts 4 for wheels (not shown) that permit the disc harrow to be transported when the wheels are in the lowered position with reference to the frame 1. A plurality of disc gangs 5 is shown, each attached to the underside of the frame at an angle to the forward direction of travel by a plurality of coil spring mounts 6 as will hereinafter be more thoroughly described.

Figure 2:
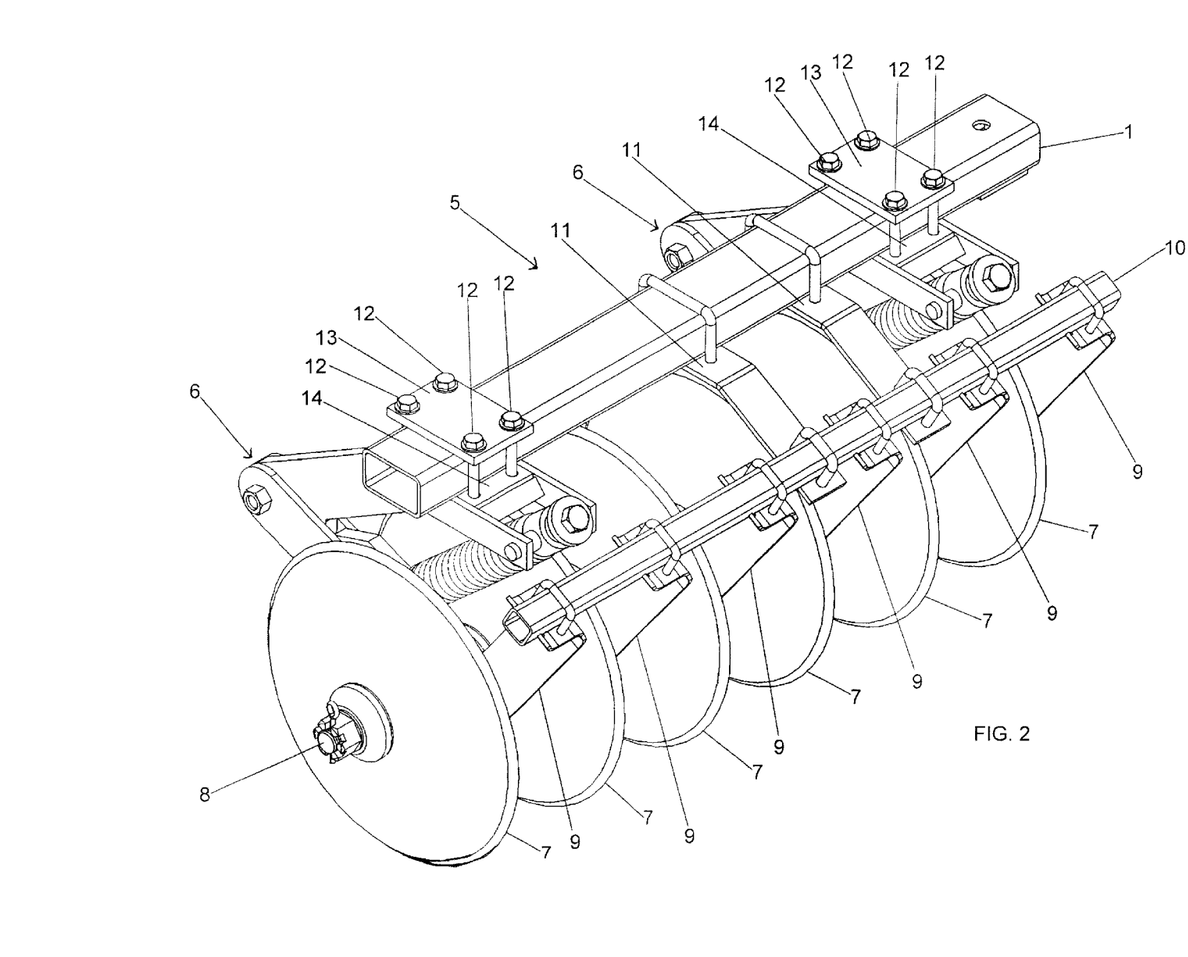
FIG. 2 is a perspective illustration of a disc gang mounted to a portion of a disc harrow frame.
Figure 3:
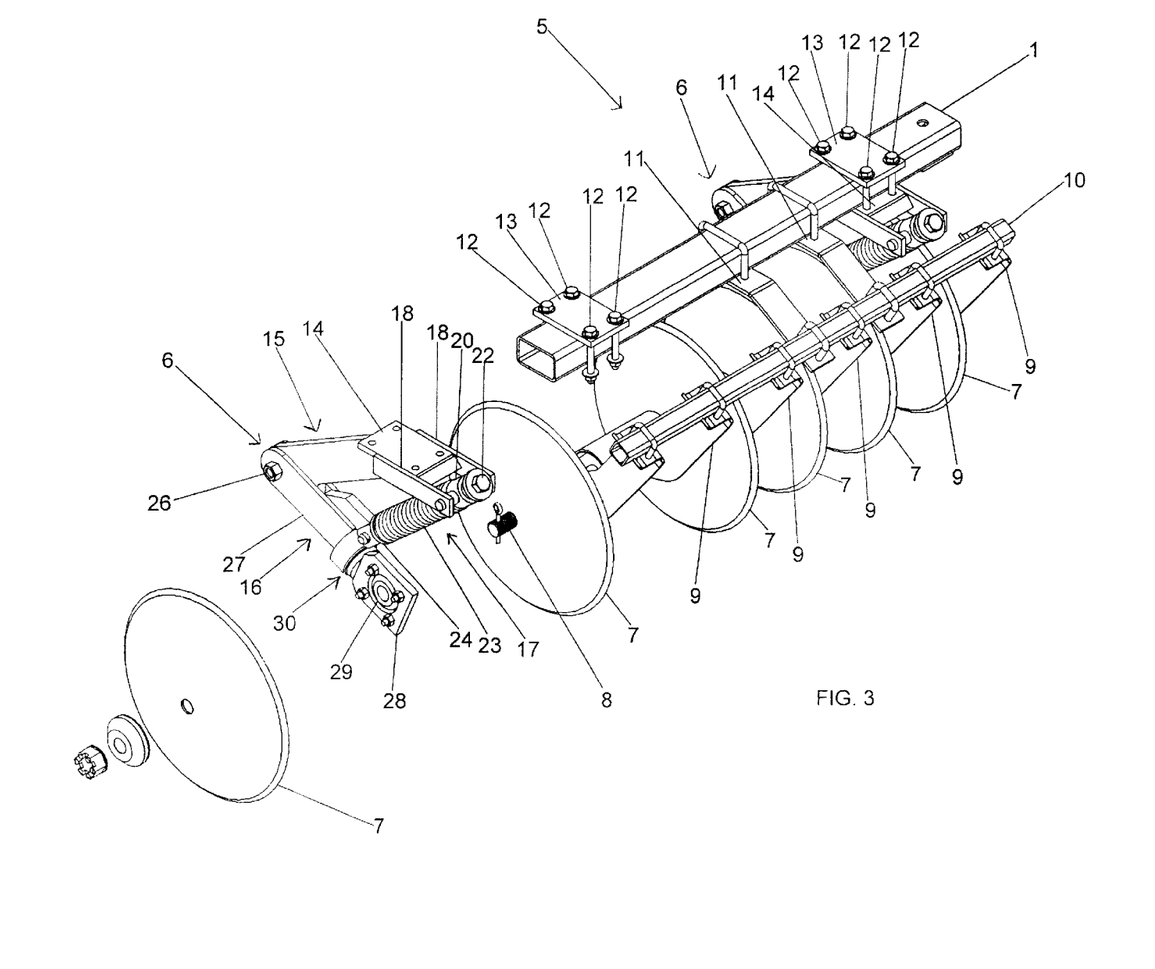
FIG. 3 is an exploded view of a disc gang mounted to a portion of a disc harrow frame.

With reference to FIGS. 2 and 3, the disc gang 5 is comprised of a plurality of concavely shaped earth working discs 7, each having an aperture at its center for passage of a gang shaft 8 therethrough. The discs 7 are oriented substantially parallel to each other and spaced apart at uniform intervals along the length of the gang shaft 8. Each disc has a scrapper 9 associated therewith in closely spaced relation with the inside of the concave surface of the disc to prevent accumulation of plant residue between the discs that could impede the overall functionality of the disc harrow. Each scrapper 9 is attached to a scrapper support member 10 that is attached to a portion of the frame 1 by means of scrapper support standoffs 11 extending rearwardly from the frame. The disc gang 5 is attached to the underside of a portion of the frame 1 by a coil spring mount 6. The coil spring mount 6 may be securely clamped to the frame using clamping bolts 12 to draw the upper 13 and lower 14 clamping plates together as shown, or alternatively secured to the frame by any other suitable means.

Figure 4:
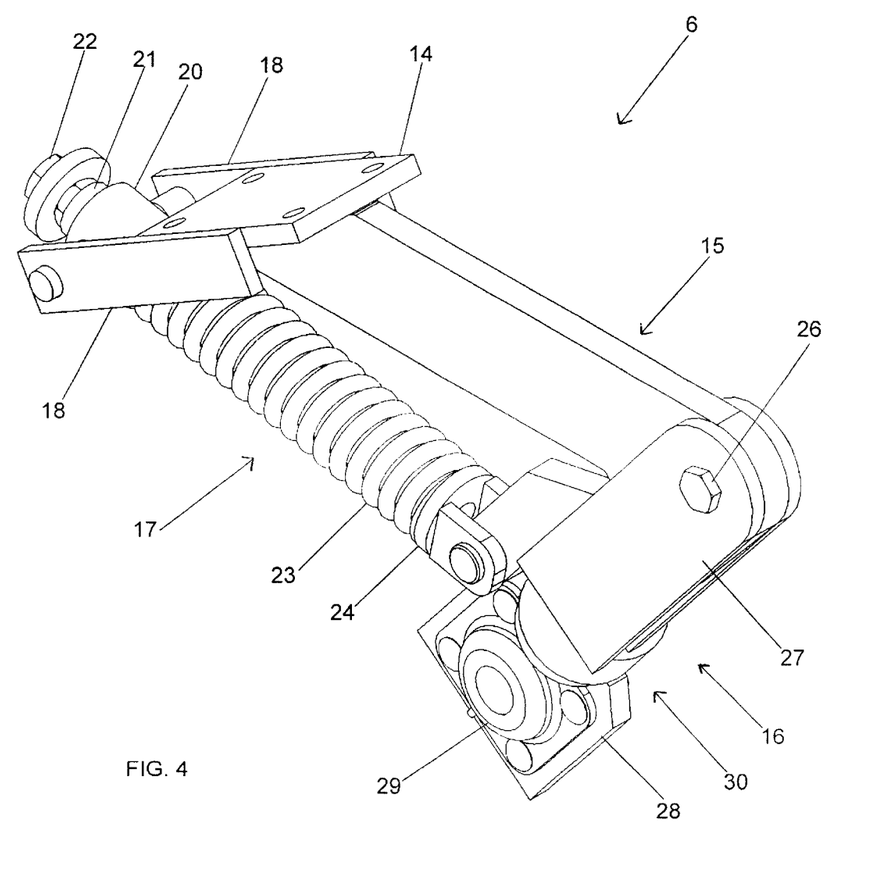
FIG. 4 is a perspective illustration of a coil spring mount.
Figure 5:
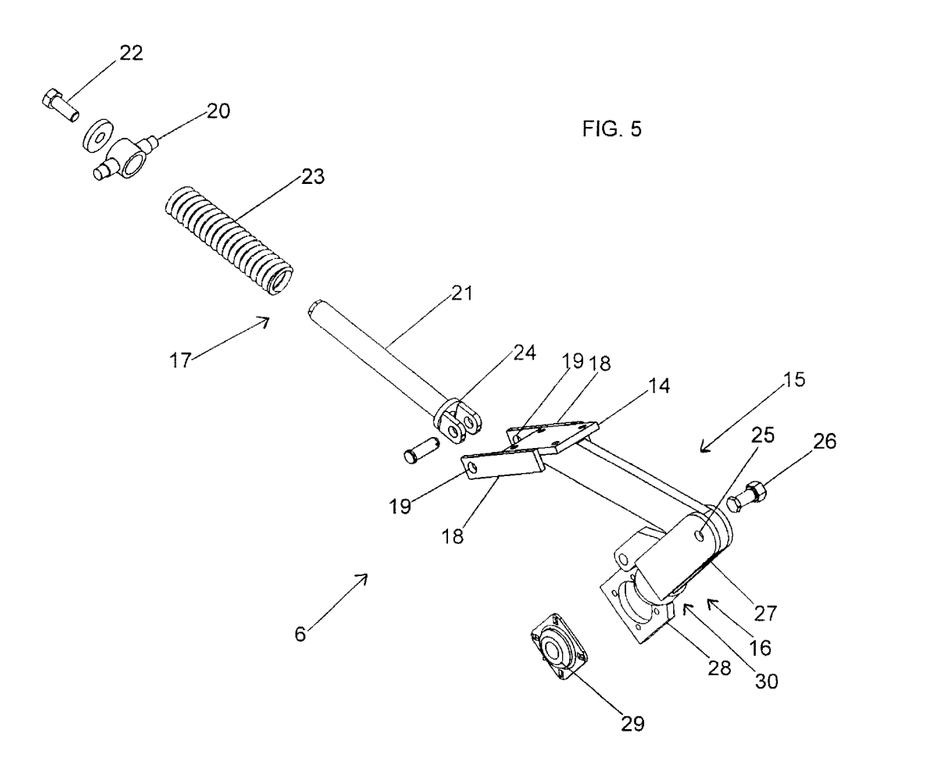
FIG. 5 is an exploded view of a coil spring mount.

With reference to FIGS. 4 and 5, the coil spring mount 6 has a first structural support member 15 and second structural support member 16 connected by a resilient coil spring 17. The upper end of the first structural support member 15 includes lower clamping plate 14 as previously described and a pair of rearwardly extending standoffs 18. Each standoff 18 is attached to clamping plate 14 and has a flat face parallel with the vertical plane formed by the first and second structural support members 15, 16. The distal end of each standoff 18 is provided with a circular aperture 19 passing through the flat vertical face. A trunnioned collar 20 is pivotally mounted through each circular aperture 19. The trunnioned collar 20 is adapted to slidably receive an internally threaded yoke 21. A hex bolt 22, optionally including a flat washer, is threaded into the upper end of the yoke 21 to retain the yoke within the trunnioned collar 20. The lower end of the yoke 21 is pivotally mounted to the second structural support member 16. A helical spring 23 is concentrically mounted on the yoke 21. The lower end of the spring 23 is seated against a circular flat washer 24 around the lower portion of the yoke 21. The upper end of the spring 23 is seated against the trunnioned collar 20.

The lower end of the first structural member 15 is provided with a circular aperture (not shown). The second structural member 16 is also provided with a complementary circular aperture 25. Horizontal pin means 26 is received through both circular apertures to thereby pivotally connect the first and second structural members 15, 16.

The second structural member 16 will now be more thoroughly described. The second structural member 16 consists of a first end portion 27 and a second end portion 28 opposite therefrom and rotationally attached thereto. The first end portion 27 is pivotally attached to the lower end of the first structural member 15. The second end portion 28 is a bearing mounting plate, including bearing 29, for receiving and rotatably supporting the gang shaft 8 as it rotates in response to normal forward movement of the disc harrow buy virtue of the engagement of the discs 7 with the ground.

Figure 6:
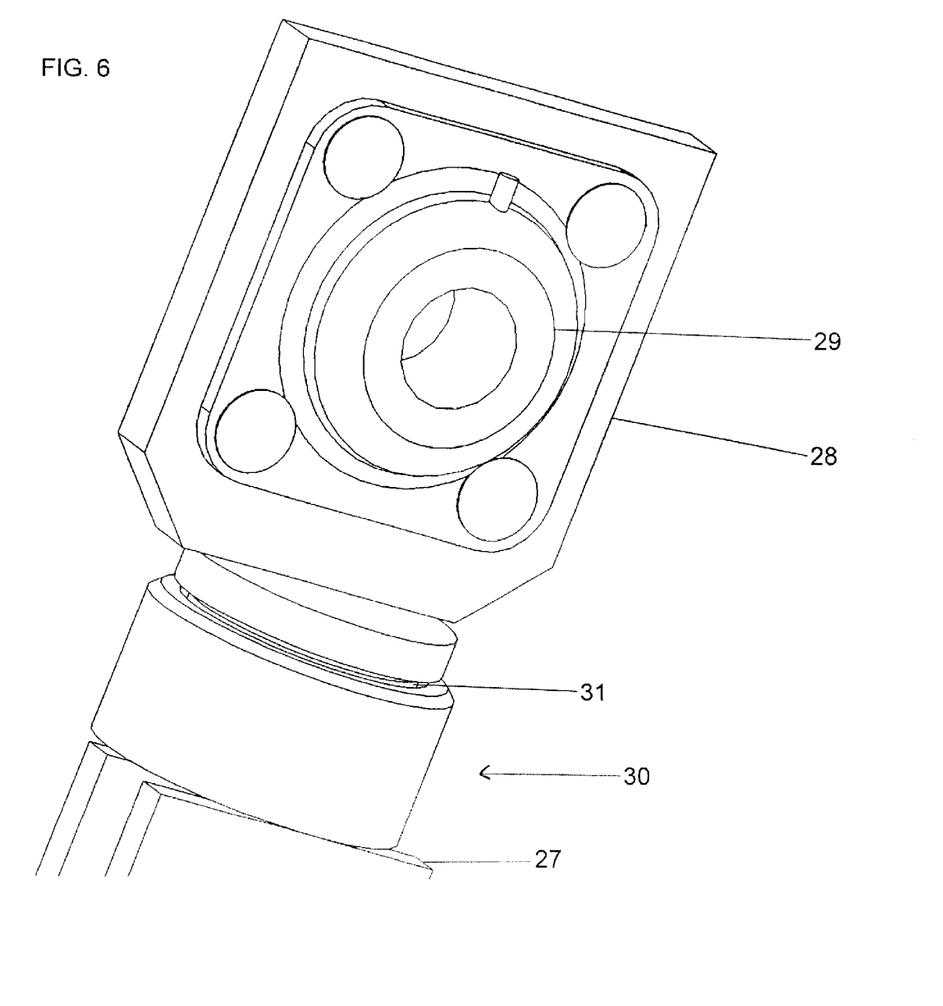
FIG. 6 is an enlarged perspective view of the second end of the second structural member, including the bearing for receiving the gang shaft.
Figure 7:
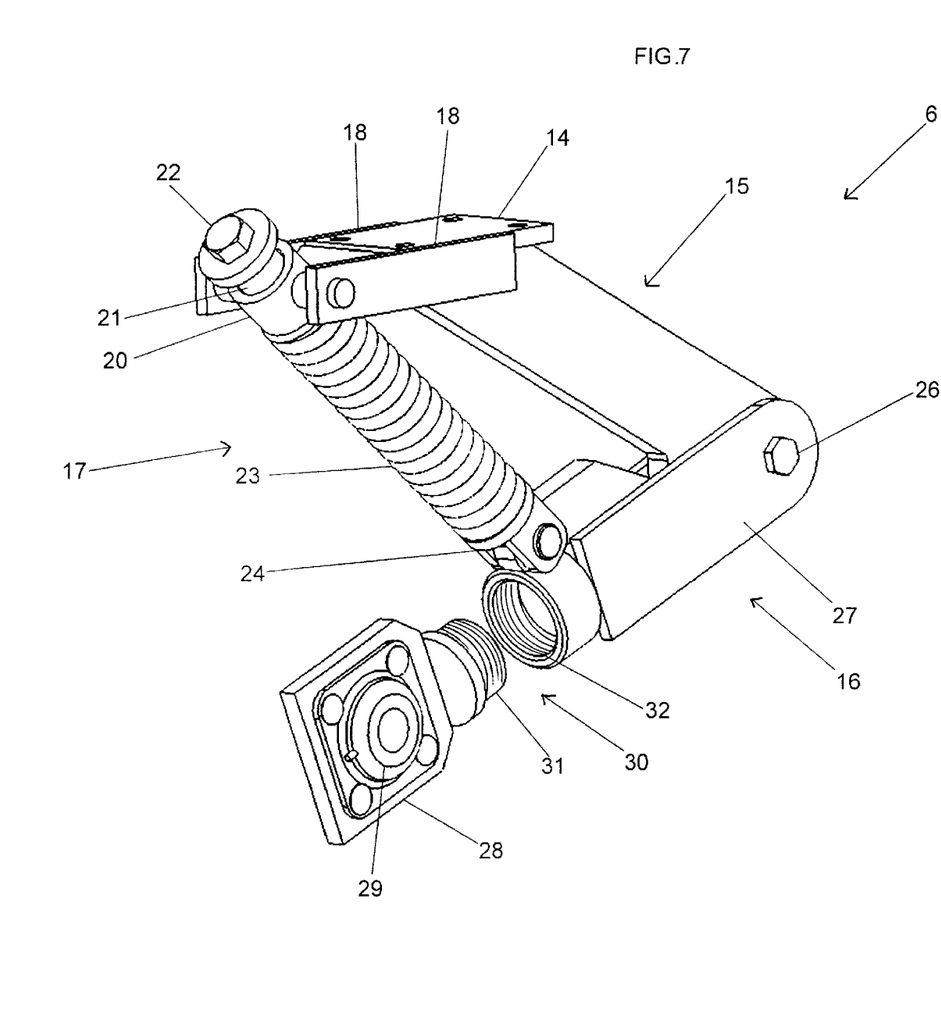
FIG. 7 is an alternative perspective view of the coil spring mount of FIG. 4.

With reference to FIGS. 6 and 7, the second end portion 28 is rotationally attached to the first end portion 27 by means of a threaded connection 30 comprised of complementary exterior 31 and interior 32 threads on each end portion, respectively, to enable the bearing plate to rotate with reference to the longitudinal axis of the second structural member 16. The threaded connection 30 is preferably comprised of a short Acme stub thread to permit the first end portion 27 and second end portion 28 to readily rotate with reference to one another. A lubricant, such as grease, may optionally be included within the threaded connection 30 to facilitate rotation and prevent galling of the threads 31, 32 or binding due to rust formation.

During operation of the disc harrow, as one end of the gang shaft 8 vertically deflects in response to impact with an obstacle, an angle is formed between the gang shaft and the vertical plane defined by the longitudinal axes of the first and second structural members 15, 16. This has the effect of placing an asymmetric load on the bearing 29, causing the second end portion 28 to automatically rotate about the longitudinal axis of the second structural member 16 by means of the threaded connection 30. The threaded connection 30 thereby permits the second end portion 28 to rotationally self-align in response to forces on the bearing 29 to maintain a perpendicular orientation of the bearing with the gang shaft 8.

It will be understood by those skilled in the art that the aforementioned threaded connection 30 may be replaced by any suitable rotational connection that permits rotational alignment of the bearing plate with reference to the longitudinal axis of its structural member. For example, the bearing 29 could be trunnion mounted, having pins substantially parallel to the longitudinal axis of the second structural member 28.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features and sub-combinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having described the invention, what is claimed is:

1. A disc harrow comprising a frame, a disc gang having a gang shaft having a plurality of ground engaging discs centrally mounted on said shaft, and a support assembly for supporting said disc gang from said frame, said support assembly comprising:
   a) a first structural member having an upper end and a lower end, said upper end attached to said frame and said lower end remote from said frame;
   b) a second structural member having a first end portion and a second end portion, said first end portion pivotally attached to said lower end of said first structural member, said second end portion having bearing means for rotatably supporting said gang shaft, said second structural member having a longitudinal axis between said first end portion and said second end portion, said second structural member operable to vertically pivot;
   c) resilient means having an upper and lower end, said upper end pivotally attached to said upper end of said first structural member and said lower end pivotally attached to said second structural member, said resilient means operable to resist vertical pivoting of said second structural member;
   d) wherein said second end portion is rotatably connected to said first end portion by rotational means to permit said second end portion to rotate with reference to said first end portion about said longitudinal axis of said second structural member in response to angular movement of said gang shaft due to impact of said disc gang with an obstacle.

2. The disc harrow of claim 1, wherein said rotational means comprises a threaded connection comprising complementary male and female threads on said end portions.

3. The disc harrow of claim a 1, wherein said resilient means comprises a helical spring.

4. The disc harrow of claim 3, wherein said helical spring is concentrically mounted on a yoke.

5. The disc harrow of claim 4, wherein said upper end of said first structural member includes a standoff.

6. The disc harrow of claim 1, wherein a perpendicular orientation is maintained between said bearing means and said gang shaft.

7. The disc harrow of claim 1, wherein said second end portion rotationally self-aligns in response to forces on said bearing means.

8. The disc harrow of claim 1, wherein said second end portion automatically rotates in response to an asymmetric load on said bearing means.

9. The disc harrow of claim 1, wherein said angular movement is accompanied by vertical movement of an end of said gang shaft.

10. The disc harrow of claim 1, wherein a vertical plane is formed by said first structural member and said second structural member and wherein an angle is formed between said vertical plane and said gang shaft during angular movement of said gang shaft.

11. The disc harrow of claim 1, wherein said rotational means permits rotational alignment of said bearing means with reference to said second structural member.

12. The disc harrow of claim 1, wherein said rotational means is a trunnion mount having pins parallel to said longitudinal axis.

13. The disc harrow of claim 1, wherein said disc harrow comprises a plurality of disc pangs.

14. The disc harrow of claim 1, wherein said disc gang has two ends, each end supported by said support assembly.

* * * * *